(12) United States Patent
Ezell et al.

(10) Patent No.: US 11,463,404 B2
(45) Date of Patent: Oct. 4, 2022

(54) QUARANTINED COMMUNICATIONS PROCESSING AT A NETWORK EDGE

(71) Applicant: Avaya Inc., Basking Ridge, NJ (US)

(72) Inventors: Joel M. Ezell, Broomfield, CO (US); Manish Chatterjee, West Bengal (IN); Biswajyoti Pal, Maharashtra (IN)

(73) Assignee: Avaya Inc., Basking Ridge, NJ (US)

( * ) Notice: Subject to any disclaimer, the term of this patent is extended or adjusted under 35 U.S.C. 154(b) by 585 days.

(21) Appl. No.: 15/485,961

(22) Filed: Apr. 12, 2017

(65) Prior Publication Data
US 2018/0302373 A1 Oct. 18, 2018

(51) Int. Cl.
*H04L 9/40* (2022.01)
*H04L 67/1036* (2022.01)
*H04L 67/63* (2022.01)

(52) U.S. Cl.
CPC ...... *H04L 63/0227* (2013.01); *H04L 63/1425* (2013.01); *H04L 67/1036* (2013.01); *H04L 67/63* (2022.05); *H04L 63/145* (2013.01); *H04L 63/1458* (2013.01)

(58) Field of Classification Search
CPC . H04L 63/0227; H04L 63/1425; H04L 67/10; G06F 21/55
USPC .......................................................... 726/13
See application file for complete search history.

(56) References Cited

U.S. PATENT DOCUMENTS

| | | | | |
|---|---|---|---|---|
| 8,234,707 B2* | 7/2012 | Stone | ...................... | H04L 45/22 709/224 |
| 2002/0107931 A1* | 8/2002 | Singh | .................... | G06Q 10/107 709/206 |
| 2003/0110288 A1* | 6/2003 | Ramanujan | ......... | H04L 63/0272 709/238 |
| 2003/0204632 A1* | 10/2003 | Willebeek-LeMair | ...................... | H04L 29/06 709/249 |
| 2004/0148520 A1* | 7/2004 | Talpade | ............... | H04L 63/0227 726/22 |
| 2004/0255161 A1* | 12/2004 | Cavanaugh | ......... | H04L 63/1408 726/23 |
| 2005/0138111 A1* | 6/2005 | Aton | .................... | G06F 11/3476 709/201 |
| 2006/0174001 A1* | 8/2006 | Zhu | ...................... | H04L 63/1416 709/225 |
| 2007/0086338 A1* | 4/2007 | Robert | ................ | H04L 63/0245 370/230 |

(Continued)

OTHER PUBLICATIONS

Kreutz, Diego, Fernando Ramos, and Paulo Verissimo. "Towards secure and dependable software-defined networks." Proceedings of the second ACM SIGCOMM workshop on Hot topics in software defined networking. ACM, 2013. (Year: 2013).*

*Primary Examiner* — Syed A Zaidi

(57) ABSTRACT

Embodiments disclosed herein provide systems and methods for quarantining communications at a network edge by routing traffic through a specialized network edge system. In a particular embodiment a method provides, identifying criteria indicating whether certain network traffic should be handled by the specialized network edge system. The method further provides receiving first information about first network traffic received at a first network edge system for a communication network. In response to determining, based on the first information, that the first network traffic satisfies the criteria, the method provides routing the first network traffic through the specialized network edge system.

20 Claims, 6 Drawing Sheets

(56) References Cited

U.S. PATENT DOCUMENTS

| | | |
|---|---|---|
| 2007/0121596 A1 | 5/2007 | Kurapati et al. |
| 2013/0125230 A1* | 5/2013 | Koponen ............ H04L 41/0823 726/13 |
| 2014/0317059 A1* | 10/2014 | Lad ..................... G06F 11/1458 707/649 |
| 2014/0376367 A1* | 12/2014 | Jain ........................ H04L 47/20 370/230 |
| 2015/0150079 A1* | 5/2015 | Hyatt ................... H04L 43/045 726/1 |
| 2017/0163544 A1* | 6/2017 | Bhandarkar ........ H04L 47/2433 |

* cited by examiner

QUARANTINED COMMUNICATIONS PROCESSING AT A NETWORK EDGE

TECHNICAL BACKGROUND

Communication traffic entering and exiting a communication network will do so through one or more network edge systems. Such network edge systems are so called based on their logical position at the "edge" of a communication network. For example, in communication networks configured for media communications (e.g., voice/video calling), a network edge system may be a Session Border Controller (SBC) that controls both the signaling used to facilitate media communications and the media communications associated with that signaling. An edge system may perform many different types of tasks including routing communication traffic into and out of the communication network, firewall functions, network address translation (NAT) functions, or any other type of function that may be desired at a network edge—including combinations thereof.

As noted above, edge systems may handle firewall functions to identify malicious network traffic and handle that traffic appropriately. Many of those functions use a relatively large amount of processing resources, which potentially places a heavy burden on an edge system when processing communication traffic. Moreover, the malicious traffic remains in the same network space as non-malicious traffic, which could lead to the malicious traffic gaining access to the communication network despite the edge system's prevention efforts.

OVERVIEW

Embodiments disclosed herein provide systems and methods for quarantining communications at a network edge by routing traffic through a specialized network edge system. In a particular embodiment a method provides, identifying criteria indicating whether certain network traffic should be handled by the specialized network edge system. The method further provides receiving first information about first network traffic received at a first network edge system for a communication network. In response to determining, based on the first information, that the first network traffic satisfies the criteria, the method provides routing the first network traffic through the specialized network edge system.

In some embodiments, the method provides receiving second information about second network traffic received at a second network edge system for the communication network and, in response to determining, based on the second information, that the second network traffic satisfies the criteria, routing the second network traffic through the specialized network edge system. In those embodiments, the first and second network edge systems may comprise two of a plurality of network edge systems from which information about network traffic is received In some embodiments, the criteria define network traffic characteristics indicative of malicious network traffic.

In some embodiments, the specialized network edge system is configured to process the first network traffic in a more resource intensive manner than that of the first network edge system In some embodiments, receiving the first information comprises receiving the first information in an edge system controller from the first network edge system via a real-time application programming interface (API) of the edge system controller.

In some embodiments, the specialized network edge system comprises a virtualized computing element. In those embodiments, the method may further provide instantiating the specialized network edge system in a quarantined software defined network.

In some embodiments, the first network edge system and the specialized network edge system each comprise a session border controller (SBC) for the communication network.

In some embodiments, the first network traffic comprises session initiation protocol (SIP) traffic.

In another embodiment, a system is provided having one or more computer readable storage media and a processing system operatively coupled with the one or more computer readable storage media. Program instructions stored on the one or more computer readable storage media, when read and executed by the processing system, direct the processing system to identify criteria indicating whether certain network traffic should be handled by the specialized network edge system. The program instructions further direct the processing system to receive first information about first network traffic received at a first network edge system for a communication network. In response to determining, based on the first information, that the first network traffic satisfies the criteria, the program instructions direct the processing system to route the first network traffic through the specialized network edge system.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

To quarantine potentially malicious network traffic from the rest of a communication network, the embodiments below describe the use of a specialized network edge system to which the potentially malicious network traffic is offloaded. Traffic may be malicious if it is part of a denial of service attack, if it carries malicious computing instructions (e.g., a virus), if it is part of an illicit attempt to gain access to a computing system, or includes some other undesirable. The offloading of potentially malicious traffic allows for that traffic to be quarantined at the specialized edge system and allows the specialized edge system to perform more resource intensive processing on that traffic without burdening the processing resources of the edge systems from which the traffic was transferred. To determine whether network traffic is potentially malicious, an edge system receiving the traffic may inspect that traffic using methods that require relatively low amounts of processing resources. If traffic is determined to be potentially malicious, the edge system can redirect that traffic to a specialized edge system, which will perform additional processing of the traffic to confirm whether the traffic is malicious.

For example, the initial edge system may determine whether a network address from which the network traffic came is a network address that is flagged as being associated with potentially malicious traffic. If the traffic is from such a network address, then the edge system redirects that traffic to a specialized edge system, which may perform more intensive processing of the traffic (e.g., deep packet inspection) to confirm whether the traffic is malicious. The initial edge system is therefore not burdened with the resource intensive processing functions of the specialized edge system and directing potentially malicious traffic to the specialized edge system quarantines the traffic in the specialized edge system to further insulate the communication network from trouble.

Figure 1:
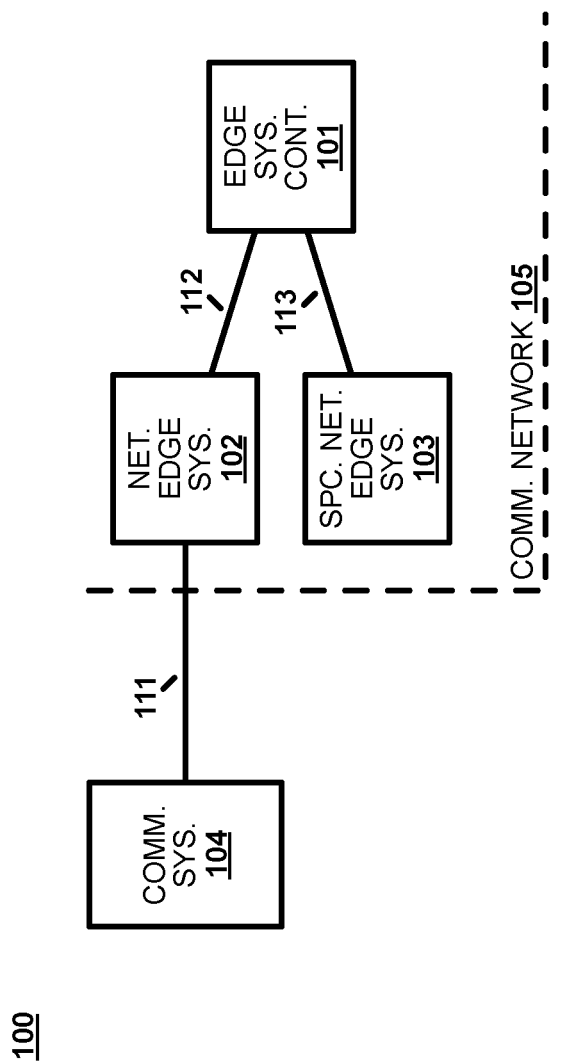
FIG. 1 illustrates a communication environment for quarantining communications processing at a network edge.

FIG. 1 illustrates communication environment 100 for quarantining communications processing at a network edge. Communication environment 100 includes edge system controller 101, network edge system 102, specialized network edge system 103, communication system 104, and communication network 105. Edge system controller 101, network edge system 102, and specialized network edge system 103 are included within communication network 105. Further, network edge system 102 and specialized network edge system 103 are edge systems for communication network 105. Communication system 104 and network edge system 102 communicate over communication link 111. Network edge system 102 and edge system controller 101 communicate over communication link 112. Specialized network edge system 103 and edge system controller 101 communicate over communication link 113.

In operation, network edge system 102 is a non-specialized edge system through which network communication traffic into and out of communication network 105 passes. The network traffic is exchanged between one or more systems within communication network 105 (not shown) and one or more systems external to communication network 105, such as communication system 104. Edge system controller 101 controls how network edge system 102 operates and, more specifically, controls whether network traffic is redirected to specialized network edge system 103 from network edge system 102.

Figure 2:
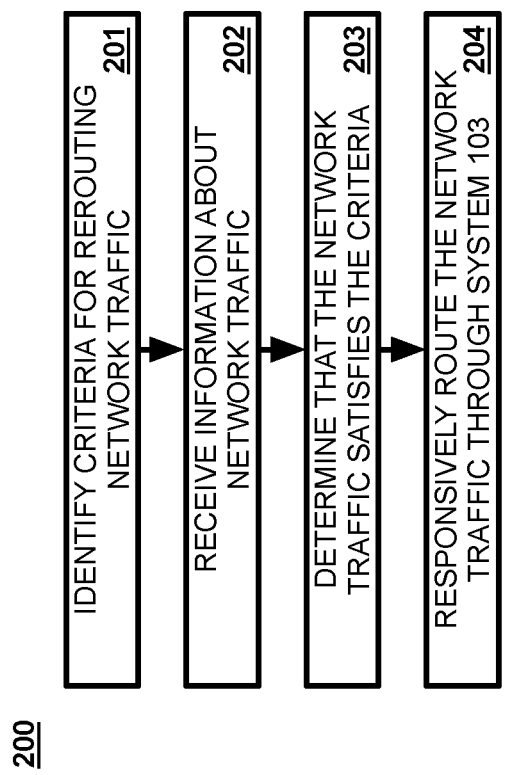
FIG. 2 illustrates a method of operating the communication environment to quarantine communications processing at a network edge.

FIG. 2 illustrates method 200 of operating the communication environment to quarantine communications processing at a network edge. Method 200 provides edge system controller 101 identifying criteria indicating whether certain network traffic should be handled by specialized network edge system 103 (201). As noted above, potentially malicious traffic may be one type of traffic that should be handled by specialized network edge system 103. The criteria may include any type of information that describes network traffic, such as source and destination network addresses of data packets included in the traffic, the type of data carried by the data packets, the amount of data, other packet header information, etc. Preferably, the criteria is based on information that can be obtained from network traffic with relatively low processing costs. For example, criteria based on a network address (e.g., network address of a source of the network traffic) in data packets of network traffic can be readily retrieved by systems in a network chain and is likely retrieved anyway as part of routing those packets. In contrast, higher cost criteria may require knowledge of packet contents and may require processing intensive deep packet inspection to obtain that knowledge.

Method 200 further provides receiving information about network traffic received at edge system controller 101 (202). In this example, the network traffic is received from communication system 104. The information about the network traffic includes any information that could be applied to the criteria identified above. For example, if the criteria is supposed to apply to a source address of network traffic (i.e., an address of communication system 104), then the information received by edge system controller 101 at this step includes a source address of the network traffic. Of course, other or additional information descriptive of the network traffic may be provided to edge system controller 101. Network edge system 102 may supply the information to edge system controller 101 immediately upon receiving and processing the information from the network traffic so that edge system controller 101 can act upon that information prior to the network traffic being allowed into communication network 105 without undue delay. In some examples, network edge system 102 and/or edge system controller 101 may provide an Application Programming Interface (API) that edge system controller 101 uses to obtain the information.

After receiving the information, method 200 provides edge system controller 101 processing the information to determine whether the information indicates that the network traffic satisfies the criteria (203). Continuing the source address example from above, the criteria may indicate that network traffic from a particular subnet should be processed by specialized network edge system 103 and edge system controller 101 determines whether the source address is in that subnet. In a similar example, the criteria may indicate a threshold number of network traffic instances that should be received from a particular subnet and any network traffic above that threshold should be processed by specialized network edge system 103.

In response to edge system controller 101 determining that the first network traffic satisfies the criteria, method 200 provides edge system controller 101 routing the network traffic through specialized network edge system 103 (204). specialized network edge system 103 may be a physical edge system similar to 102 or may be a virtual computing element, such as a virtual machine or container, hosted by a physical computing system. If specialized network edge system 103 is a virtual element, edge system controller 101 may initiate the virtual element once the determination is made to route the network traffic to specialized network edge system 103. In some examples, specialized network edge system 103 may operate in a virtual network segregated from the rest of communication network 105 to provide an extra layer of separation from communication network 105 should the network traffic be malicious. Routing the network traffic to specialized network edge system 103 may be achieved by edge system controller 101 directing network edge system 102 to forward the network traffic to specialized network edge system 103, by directing a router to transfer the network traffic to specialized network edge system 103 instead of network edge system 102, by directing communication system 104 to communicate with specialized network edge system 103 rather than network edge system 102, or redirecting the network traffic in some other manner.

Advantageously, after being routed to specialized network edge system 103 the network traffic can be handled by specialized network edge system 103 in ways that either could not be performed by network edge system 102 or would place an undesirable processing burden on network edge system 102, especially in view of other network traffic that network edge system 102 likely also has to handle. Moreover, in cases where the network traffic is offloaded to specialized network edge system 103 for being potentially malicious traffic, moving the network traffic to specialized network edge system 103 effectively quarantines the network traffic from the paths of other network traffic that was determined to not be potentially malicious. In some examples, specialized network edge system 103 may be configured to handle only single instances of network traffic, such as the traffic from communication system 104 discussed above, or may be configured to handle other network traffic that was also determined to satisfy the criteria in accordance with method 200.

Referring back to FIG. 1, edge system 102 comprises a computer processing system and communication interface. Edge system 102 may also include other components such as a router, server, data storage system, and power supply. Edge system 102 may reside in a single device or may be distributed across multiple devices. Specialized network edge system 103 may comprise similar components to those of edge system network edge system 102. If specialized network edge system 103 comprises a virtual element, then the system hosting specialized network edge system 103 would include components similar to those of network edge system 102. Edge system controller 101 also includes components similar to those of network edge system 102. In some examples, the functions of edge system controller 101 may be incorporated into network edge system 102.

Communication system 104 comprises a computer processing system and a communication interface. Communication system 104 may also include a user interface, memory device, software, or some other communication components. Communication system 104 may be a telephone, tablet, watch, computer, gateway, e-book, mobile Internet appliance, network interface card, media player, game console, or some other communication apparatus—including combinations thereof.

Communication links 111-113 could use various communication protocols, such as Time Division Multiplex (TDM), Internet Protocol (IP), Ethernet, communication signaling, Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other communication format—including combinations thereof. Communication links 111-113 could be direct links or may include intermediate networks, systems, or devices.

Figure 3:
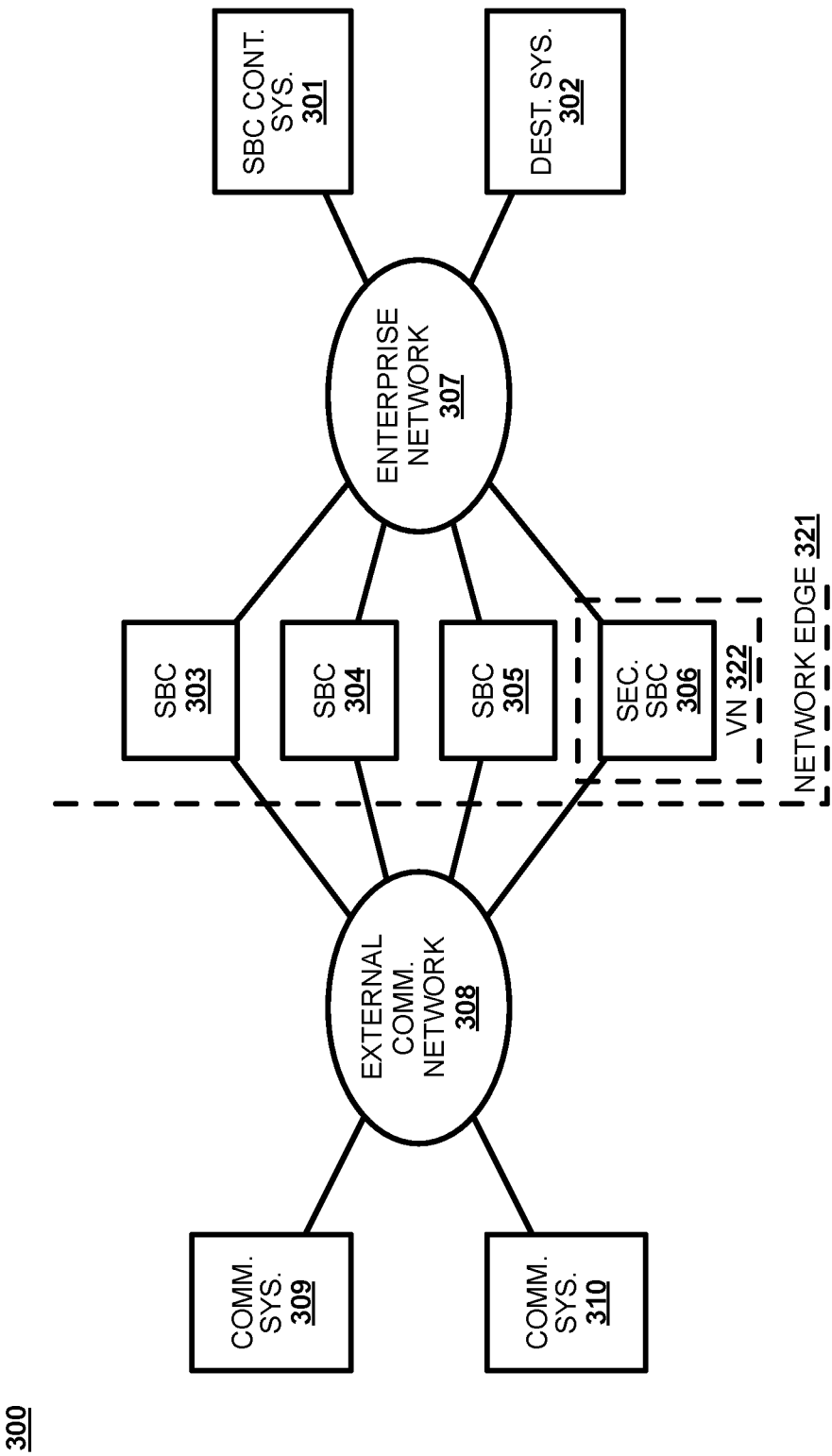
FIG. 3 illustrates another communication environment for quarantining communications processing at a network edge.

FIG. 3 illustrates communication environment 300 for quarantining communications processing at a network edge. communication environment 300 includes Session Border Controller (SBC) management system 301, destination system 302, SBC 303, SBC 304, SBC 305, security SBC 306, enterprise communication network 307, external communication network 308, communication system 309, and communication system 310. While shown separately, elements 301-306 are considered part of enterprise communication network 307 with SBC 303, SBC 304, SBC 305, and security SBC 306 being edge systems located at network edge 321 of enterprise communication network 307 through which network traffic entering and exiting enterprise communication network 307 must pass.

In operation, destination system 302 comprises a media communication service system that facilitates media communications between communication systems outside of enterprise communication network 307 (e.g., systems on external communication network 308) and communication systems (not shown) within enterprise communication network 307. external communication network 308 may include the Internet, one or more Local Area Networks (LANs), or any other type of communication network not considered part of enterprise communication network 307. The media communications may include user voice communications, user video communications, user text communications, or any other type of media users may wish to exchange. Accordingly, communication system 309 and communication system 310 both should comprise user devices (e.g., personal computers, tablet computers, smartphones, etc.), although may comprise other types of systems especially in situations where malicious network traffic is being transferred to enterprise communication network 307. SBC management system 301 is configured to identify network traffic that is potentially malicious and reroute that potentially malicious network traffic to security SBC 306. In this example, security SBC 306 is segregated from the rest of enterprise communication network 307 using virtual network 322. Virtual network 322 may comprise a Virtual Local Area Network (VLAN), a Virtual Private Network (VPN), or some other type of software defined network (SDN) that can segregate security SBC 306 from the remainder of enterprise communication network 307.

Figure 4:
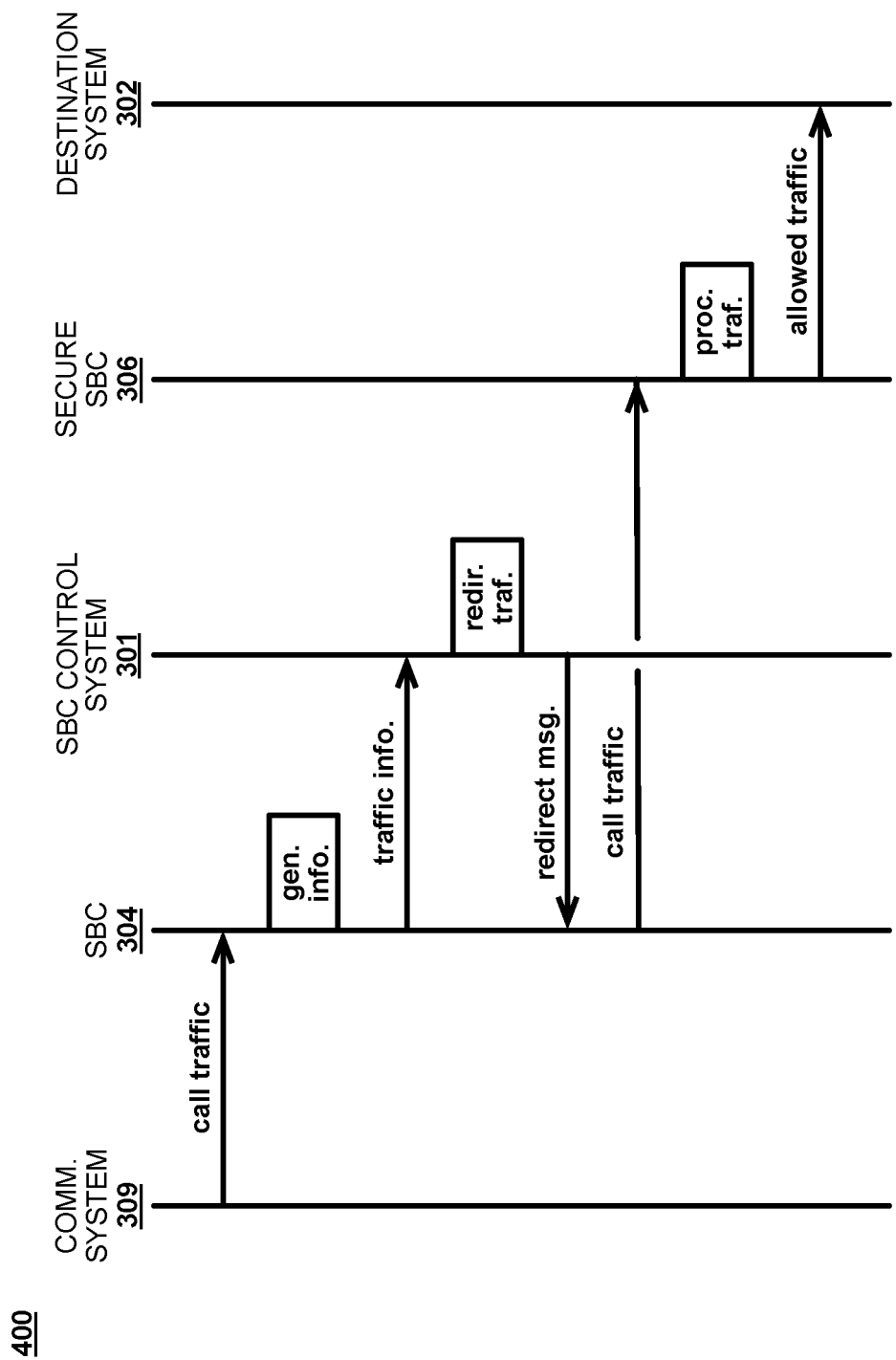
FIG. 4 illustrates an operational scenario of the communication environment to quarantine communications processing at a network edge in an implementation.

FIG. 4 illustrates operational scenario 400 of communication environment 300 to quarantine communications processing at a network edge in an implementation. In scenario 400, communication system 309 generates network traffic to initiate a call and transfers that network traffic towards destination system 302. It should be understood that the use of the term call refers to user communications including any type of media discussed above not just voice call. Also, while the call traffic in this example is traffic to initiate a call, the call traffic in other examples could be some other type of network traffic handled by an SBC. The call traffic is routed through external communication network 308 to one of SBC 303, SBC 304, and SBC 305. In this example, SBC 304 is the SBC that receives the call traffic from communication system 309.

Upon receiving the call traffic, external communication network 308 analyses the call traffic to generate traffic information about that call traffic. The traffic information may include any type of information that SBC management system 301 has indicated to SBC 304 is needed for SBC management system 301 to determine that network traffic is potentially malicious. For instance, the information may include a network address of communication system 309, network addresses of intermediate systems between communication system 309 and SBC 304, or some other type of information descriptive of the call traffic. The traffic information is transferred to SBC management system 301 upon being generated. An API of SBC management system 301 may be used by SBC 304 to facilitate the transfer of the traffic information. For example, to give SBCs 303-305 the ability to transfer traffic information to SBC management system 301, as described above, SBC management system 301 may provide SBCs 303-305 with SBC management system 301's API. SBC 304 in this example would therefore use one or more calls to SBC management system 301's API in order to provide SBC management system 301 with the traffic information.

Responsive to receiving the traffic information, SBC management system 301 applies criteria to the traffic information to determine whether the call traffic is potentially malicious. The criteria may indicate parameters in which the traffic information should be considered potentially malicious. If the traffic information fits those parameters, then SBC management system 301 identifies the call traffic as being potentially malicious, which is the conclusion made by SBC management system 301 in this example. In one example, the criteria may indicate certain subnets of external communication network 308 that potentially malicious traffic tends to come from and, the call traffic from communication system 309 may originate or pass through one of those subnets thereby satisfying the criteria. Regardless of the reason for the call traffic being identified as potentially malicious, SBC management system 301 redirects the call traffic through security SBC 306.

To redirect the call traffic, in this example, SBC management system 301 sends a redirect message to SBC 304 instructing SBC 304 to transfer the call traffic already received by SBC 304 to security SBC 306. SBC 304 responsively transfers the packets of the call traffic in possession of SBC 304 to security SBC 306. SBC management system 301 may also indicate to a router in external communication network 308 to direct subsequent packets of the call traffic from communication system 309 to security SBC 306. That router may be one of multiple routers located in external communication network 308 that distribute incoming call traffic between SBCs of enterprise network 307. In some cases, the routers may be operated by the same entity as enterprise network 307, although, their logical location outside of network edge 321 lends them to being considered part of external communication network 308. Since security SBC 306 is located within virtual network 322 in this example, the call traffic is directed to an address of security SBC 306 within virtual network 322. In some cases, should SBC 304 subsequently receive additional packets for the call traffic, SBC 304 will pass those packets on to security SBC 306 as well.

Upon receiving the call traffic, security SBC 306 processes the call traffic to determine whether the call traffic is actually malicious traffic. security SBC 306 may apply additional criteria to the additional traffic information determined by security SBC 306 during the processing. In one example, security SBC 306 may perform deep packet inspection on the packets of the call traffic to identify the payload of the packets. Having security SBC 306 perform the more processing intensive operation of deep packet inspection allows SBC 304 to use its processing resources for other purposes, such as processing additional call traffic from other communication systems, such as communication system 310. For instance, the additional criteria may indicate what security SBC 306 should look for in packets of legitimate call traffic and anything not fitting the description of being legitimate call traffic is designated as being malicious.

Any traffic designated as being malicious by security SBC 306 is blocked from entering enterprise communication network 307 and, therefore, does not make it past security SBC 306. Moreover, since security SBC 306 is located in virtual network 322, the malicious traffic remains further quarantines from the systems in enterprise communication network 307. If, however, security SBC 306 determines that the call traffic is not malicious, then the call traffic is allowed into enterprise communication network 307 and, consequently, allowed to reach destination system 302. security SBC 306 may continue to handle subsequent network traffic associated with the call traffic or may direct the subsequent traffic back through SBC 303, SBC 304, or SBC 305 to be handled like any other non-malicious traffic.

It should be understood that, while the above example focuses on call traffic between communication system 309 and SBC 304, the same procedure would be followed if the call traffic was handled by SBC 303 or SBC 305, or originated from communication system 310 or some other communication system. Moreover, at any given time, each of SBC 303, SBC 304, and SBC 305 may be handling call traffic from any number of communication systems on external communication network 308. Hopefully, most of that traffic is determined to not be potentially malicious and can continue to be handled by SBC 303, SBC 304, and SBC 305. security SBC 306 may be configured to handle all potentially malicious traffic trying to enter enterprise communication network 307 or may be one of multiple other security edge systems.

Figure 5:
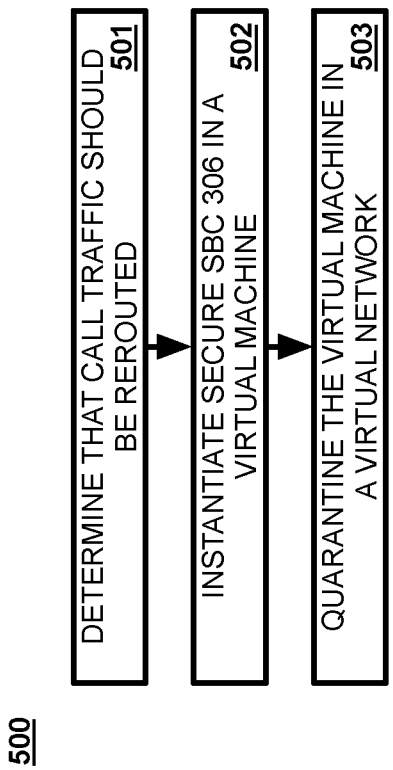
FIG. 5 illustrates a method of operating the other communication environment to quarantine communications processing at a network edge.

FIG. 5 illustrates method 500 of operating communication environment 300 to quarantine communications processing at a network edge. In this example, communication environment 300 instantiates security SBCs on demand when needed for processing potentially malicious call traffic. In particular, each security SBC is implemented as a virtual machine executing on a host system (e.g., via a hypervisor that manages the distribution of host resources to virtual machines thereon). Method 500 provides SBC management system 301 determining that call traffic should be rerouted to a security edge system in a manner similar to that described above in scenario 400 (501). Method 500 further provides SBC management system 301 instantiating security SBC 306 as a virtual machine on a host system within enterprise communication network 307 (502) and quarantining security SBC 306 in virtual network 322 (503).

Figure 6:
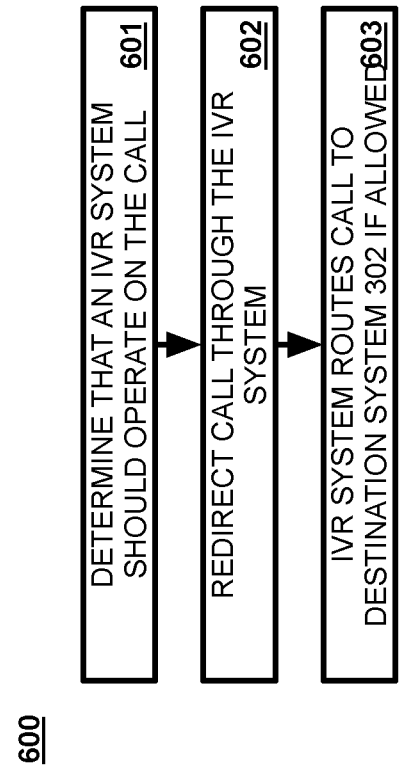
FIG. 6 illustrates a method of operating the other communication environment to quarantine communications processing at a network edge.

FIG. 6 illustrates method 600 of operating communication environment 300 to quarantine communications processing at a network edge. In this example, rather than determining that call traffic should be blocked entirely, security SBC 306 determines that an additional entity should handle the call traffic before gaining admittance into enterprise communication network 307. That entity, in this particular example, is an Interactive Voice Response (IVR) system, which may be a dedicated physical computing system on enterprise communication network 307 or may be implemented as a virtual machine like security SBC 306 is in method 500. Other types of entities may also be used.

Method 600 provides security SBC 306 determining that an IVR system should operate on the call traffic (601). The determination may be based on criteria similar to that used by security SBC 306 in scenario 400. In this case, the criteria indicates call traffic characteristics that require further information before blocking or allowing the call traffic. For example, past network traffic that may be used when determining the criteria may have possessed characteristics that applied to both malicious and non-malicious traffic. Thus, the IVR may be used for future call traffic, such as the call traffic of this example, to determine whether the call traffic is associated with an actual user or is merely associated with a system attempting to send malicious traffic into enterprise communication network 307.

In response to determining that the IVR system should be used, method 600 redirects the call traffic through the IVR system (602). In response to receiving the call traffic, the IVR system establishes a media channel for the call with communication system 309 through security SBC 306. Via the media channel, the IVR may query a user, if there is a user, at communication system 306 and determines whether the responses indicate that a proper user is operating communication system 309. If the IVR system determines that a user is operating communication system 309, then the IVR system routes the call to destination system 302 (603). Alternatively, if the IVR system does not determine that a user is operating communication system 309, then IVR system does not route the call the destination system 302. Moreover, the IVR system may notify security SBC 306 that future call traffic from communication system 309 should be blocked.

Figure 7:
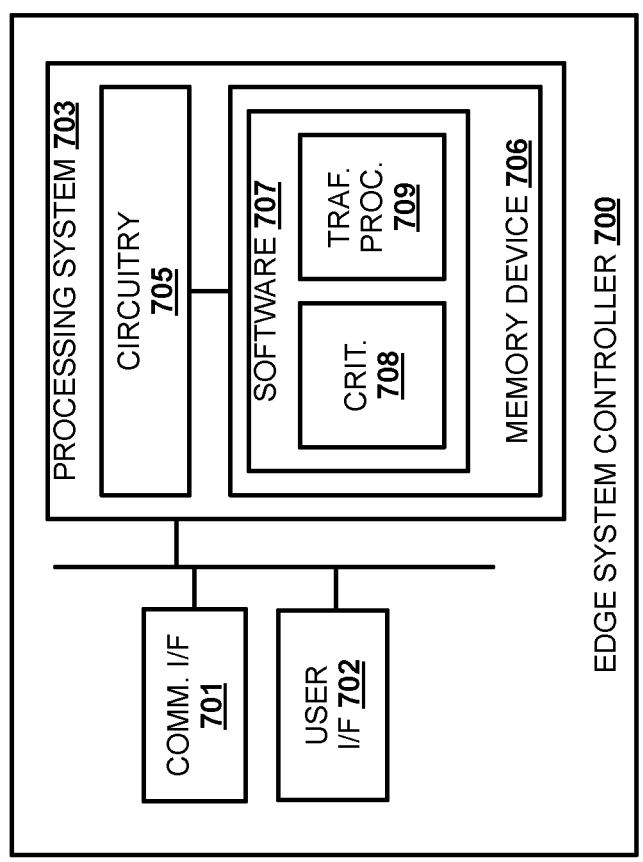
FIG. 7 illustrates an edge system controller for quarantining communications processing at a network edge.

FIG. 7 illustrates edge system controller 700. Edge system controller 700 is an example of edge system controller 101 and SBC management system 301, although systems 101 and 301 may use alternative configurations. Edge system controller 700 comprises communication interface 701, user interface 702, and processing system 703. Processing system 703 is linked to communication interface 701 and user interface 702. Processing system 703 includes processing circuitry 705 and memory device 706 that stores operating software 707.

Communication interface 701 comprises components that communicate over communication links, such as network cards, ports, RF transceivers, processing circuitry and software, or some other communication devices. Communication interface 701 may be configured to communicate over metallic, wireless, or optical links. Communication interface 701 may be configured to use TDM, IP, Ethernet, optical networking, wireless protocols, communication signaling, or some other communication format—including combinations thereof.

User interface 702 comprises components that interact with a user. User interface 702 may include a keyboard, display screen, mouse, touch pad, or some other user input/output apparatus. User interface 702 may be omitted in some examples.

Processing circuitry 705 comprises microprocessor and other circuitry that retrieves and executes operating software 707 from memory device 706. Memory device 706 comprises a non-transitory storage medium, such as a disk drive, flash drive, data storage circuitry, or some other memory apparatus. Operating software 707 comprises computer programs, firmware, or some other form of machine-readable processing instructions. Operating software 707 includes criteria module 708 and traffic processing module 709. Operating software 707 may further include an operating system, utilities, drivers, network interfaces, applications, or some other type of software. When executed by circuitry 705, operating software 707 directs processing system 703 to operate edge system controller 700 as described herein.

In particular, criteria module 708 directs processing system 703 to identify criteria indicating whether certain network traffic should be handled by the specialized network edge system. Traffic processing module 709 directs processing system 703 to receive first information about first network traffic received at a first network edge system for a communication network. In response to determining, based on the first information, that the first network traffic satisfies the criteria, traffic processing module 709 further directs processing system 703 to route the first network traffic through the specialized network edge system.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of routing network traffic through a specialized network edge system for a communication network, the method comprising:
in an edge system controller within the communication network:
identifying criteria indicating whether certain network traffic should be handled by the specialized network edge system;
receiving, from a first network edge system for the communication network, first information about first network traffic entering the communication network through the first network edge system from outside the communication network; and
in response to determining, based on the first information, that the first network traffic satisfies the criteria, routing the first network traffic through the specialized network edge system.

2. The method of claim 1, further comprising:
receiving second information about second network traffic received at a second network edge system for the communication network; and
in response to determining, based on the second information, that the second network traffic satisfies the criteria, routing the second network traffic through the specialized network edge system.

3. The method of claim 2, wherein the first and second network edge systems comprise two of a plurality of network edge systems from which information about network traffic is received.

4. The method of claim 1, wherein the criteria define network traffic characteristics indicative of malicious network traffic.

5. The method of claim 1, wherein the specialized network edge system is configured to perform at least one processing function on the first network traffic that the first network edge system does not perform.

6. The method of claim 1, wherein receiving the first information comprises receiving the first information in an edge system controller from the first network edge system via a real-time application programming interface (API) of the edge system controller.

7. The method of claim 1, wherein the specialized network edge system comprises a virtualized computing element.

8. The method of claim 7, further comprising:
instantiating the specialized network edge system in a quarantined software defined network.

9. The method of claim 1, wherein the first network edge system and the specialized network edge system each comprise a session border controller (SBC) for the communication network.

10. The method of claim 1, wherein the first network traffic comprises session initiation protocol (SIP) traffic directed to a destination system within the communication network.

11. A system for routing network traffic through a specialized network edge system for a communication network, the system comprising:
one or more computer readable storage media;

a processing system operatively coupled with the one or more computer readable storage media; and program instructions stored on the one or more computer readable storage media that, when read and executed by the processing system, direct the processing system to:

identify criteria indicating whether certain network traffic should be handled by the specialized network edge system;

receiving, from a first network edge system for the communication network, first information about first network traffic entering the communication network through the first network edge system from outside the communication network; and in response to determining, based on the first information, that the first network traffic satisfies the criteria, route the first network traffic through the specialized network edge system.

12. The system of claim 11, wherein the program instructions further direct the processing system to:

receive second information about second network traffic received at a second network edge system for the communication network; and in response to determining, based on the second information, that the second network traffic satisfies the criteria, route the second network traffic through the specialized network edge system.

13. The system of claim 12, wherein the first and second network edge systems comprise two of a plurality of network edge systems from which information about network traffic is received.

14. The system of claim 11, wherein the criteria define network traffic characteristics indicative of malicious network traffic.

15. The system of claim 11, wherein the specialized network edge system is configured to perform at least one processing function on the first network traffic that the first network edge system does not perform.

16. The system of claim 11, wherein the system implements an edge system controller and wherein to receive the first information the program instructions direct the processing system to at least receive the first information from the first network edge system via a real-time application programming interface (API) of the edge system controller.

17. The system of claim 11, wherein the specialized network edge system comprises a virtualized computing element.

18. The system of claim 17, wherein the program instructions further direct the processing system to:

instantiate the specialized network edge system in a quarantined software defined network.

19. The system of claim 11, wherein the first network edge system and the specialized network edge system each comprise a session border controller (SBC) for the communication network.

20. The system of claim 11, wherein the first network traffic comprises session initiation protocol (SIP) traffic directed to a destination system within the communication network.

\* \* \* \* \*